June 23, 1931. J. L. L. A. A. MOULET Re. 18,112
DIAPHRAGM FUEL PUMP
Original Filed July 9, 1918
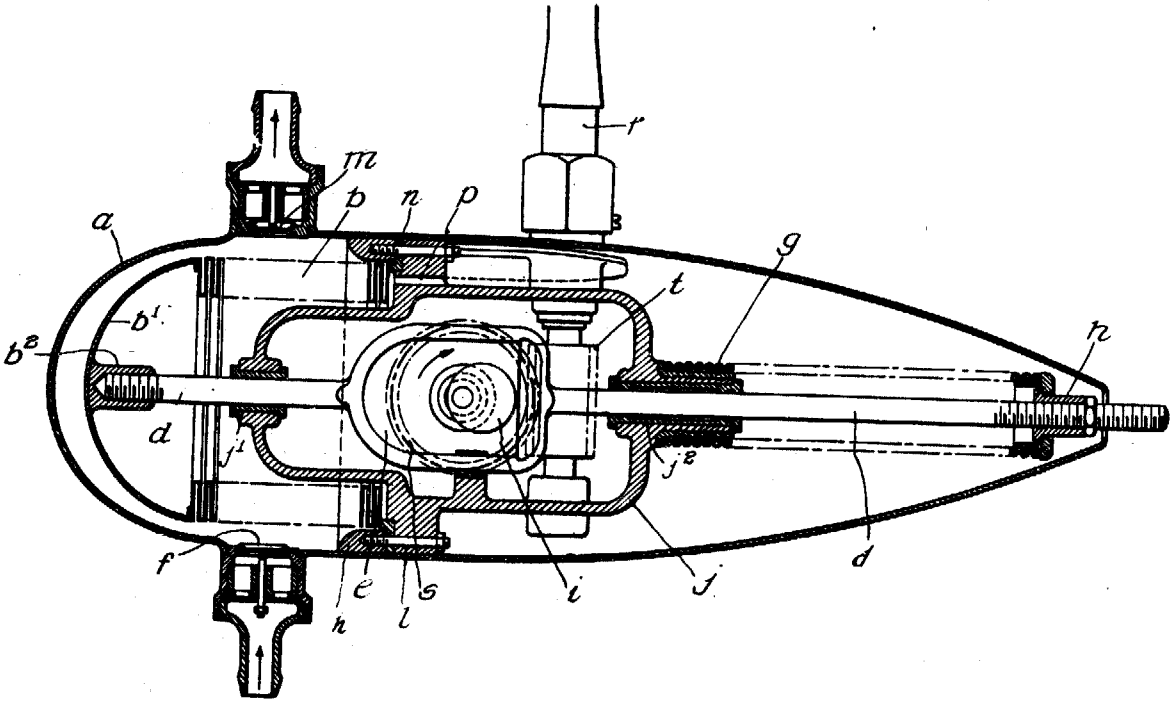
Inventor:
Jean L.L.A.A. Moulet,
By [illegible]
Attys.

Reissued June 23, 1931

Re. 18,112

UNITED STATES PATENT OFFICE

JEAN LOUIS LÉON ALEXANDRE ALBERT MOULET, OF BOULOGNE-SUR-SEINE, FRANCE, ASSIGNOR TO STEWART-WARNER CORPORATION, OF CHICAGO, ILLINOIS, A CORPORATION OF VIRGINIA

DIAPHRAGM FUEL PUMP

Original No. 1,597,689, dated August 31, 1926, Serial No. 244,126, filed July 9, 1918, and in France June 4, 1917. Application for reissue filed April 10, 1930. Serial No. 443,204.

My invention relates to an improved regulating pump applicable to aerial machine motors.

In aerial machines and particularly in aeroplones, in order to provide for the proper balancing of parts it is necessary that the supply of fuel should be placed below the carbureters of the motor requiring to be fed. This is particularly the case for aeroplanes having an extensive range of action on account of the heavy weight of fuel which it is necessary to carry. The result is that the fuel must be raised as fast as it is used by means of an auxiliary part acting as a pump. The accompanying drawing which fully illustrates my invention shows a sectional plan of my improved regulating pump.

My improved regulating pump consists of an outer envelope or casing $a$ an inner envelope $b$ and framework forming a gear case $j$. This envelope $b$ has a convex end and is provided with folds so as to be collapsible and extensible, and thus subject to deformation by elasticity in a direction perpendicular to the folds.

The liquid circulates between these two envelopes or casings which are connected in such a manner as to be thoroughly watertight. Upon the outer envelope are mounted two valve chests containing one a clack valve $f$ opening in the direction of suction and the other a similar clack valve $m$ opening in the forcing out sense. The inlet valve $f$ is connected to the main fuel tank which will usually lie on a level below that of the carbureter and the outlet valve $m$ is connected to the constant level fuel tank of the carbureter.

A sliding rod $d$ is screwed centrally at the convex end $b^1$ of the envlope $b$ in a sleeve $b^2$ and is guided in a longitudinal sense, this rod being moreover recessed or hollowed out at $e$. The spring $g$ is held at one end by the tension regulating device $h$ and at the other by the hub of the gear case $j$ while it is coiled around the sliding rod $d$. The casing $j$ supports the guide bearings $j^1$ and $j^2$ for the reciprocating rod or stem $d$. This spring which is suitably tightened has a tendency of maintaining the contact between the rear part of the recess $e$ and an eccentrically journaled cam $i$ whose journals turn in bearings formed integrally with the fixed part of the apparatus. Motion is imparted to the cam $i$ by a helicoidal pinion $s$ gearing with the worm $t$ keyed on the motor shaft $r$ of the machine.

The pump operates as follows: As the cam turns in the direction indicated by the arrow the connecting rod is longitudinally displaced for half a turn, the spring $g$ is stretched the envelop $b$ collapses, and the suction of the liquid takes place between the two envelopes $a$ and $b$. As the cam $i$ continues to rotate for another half turn, the spring $g$ is distended and pushes the connecting rod in an opposite direction, the envelope $b$ returns to its former position and the liquid is now forced out. The pump supply operated in the manner aforesaid is supposed to exceed the carbureter's consumption, the sucked up fuel gradually chokes the pump as the forcing out is incomplete, by reason of the incompressibility of the liquid, the spring is gradually tightened and the deformation of the envelope $b$ increases. The cam $i$ breaks contact with the rod which ceases to have any effect on the suction until normal conditions prevail anew. The stroke corresponding to the feed is thus automatically regulated however such feed may vary. The gear case $j$ forming the framework contains all the moving parts and may be kept filled with oil.

The diaphragm $b^2$ forms a tight seal for the pumping chamber by being secured between a shoulder $k$ of the outer casing $a$ and a flange $l$ of the lubricant casing for the operating parts. The motor shaft extends into the lubricant chamber and drives the stem of the diaphragm through the gears and the lost motion connection between the cam and the stem. The actuating parts are therefore fully lubricated to give a quiet operation in a chamber which is separated from the pumping chamber by an intermediate chamber in back of the diaphragm. The division wall includes a guide bearing for the reciprocating pump stem. The intermediate chamber is vented by a breather opening extending through the attaching flange of the inner casing.

The chamber between the diaphragm and the casing which is in communication with the valve-controlled inlet and exhaust passages constitutes a variable capacity pumping chamber which maintains a constant pressure on the fuel supplied to the carbureter. The pipe connection from the supply tank through which the fuel is lifted to the pumping chamber is arranged in such a manner as to have a constant capacity, that is, the expansion of the pumping chamber during the positive suction stroke of the diaphragm does not produce a reduction in the volumetric capacity of the inlet connection between the tank and the pumping chamber. Therefore, the full force of the suction developed by the expansion of the pumping chamber is utilized for lifting the fuel from the low level source of supply. In order to produce the flow required at high speeds of the engine it is desirable that a high suction pressure be developed during the action of the pump to draw fuel from the supply tank but the discharge pressure required is generally low and should be just sufficient to balance the delivery head and the resistance of the carbureter float valve when shut off. My invention provides a positive suction pressure which is greater than the discharge pressure permitted by the resilient means. A pump in which the suction pressure is limited by the delivery pressure permitted would not be as efficient. Furthermore it will be noted that according to my invention the pumping chamber during running speeds of the engine is maintained substantially at its full capacity since the pumping diaphragm only takes a short stroke due to the resilient discharge pressure and is immediately returned by the cyclically operable actuating means which picks up the stem of the diaphragm at the limit of the lost motion. Such an operation is more desirable than a system in which a diaphragm must complete an exhaust stroke and empty the pumping chamber before the chamber can be filled by a new suction stroke since in the latter case the pumping chamber may be empty when a sudden demand occurs.

Having now described my invention what I claim as new and desire to secure by Letters Patent is:

1. A diaphragm fuel pump, comprising in combination, an outer envelope, and inlet valve on said envelope adapted to be connected to a fuel supply, an outlet valve on said envelope adapted to be connected to the constant level fuel tank of a carbureter, an inner collapsible and extensible envelope forming a liquid-tight joint with the outer envelope, a silding rod secured to the inner collapsible envelope, an eccentric cam adapted to positively move said rod in the direction corresponding to suction to draw fuel from the fuel supply past the inlet valve, means for operating said cam, and elastic means adapted to return the inner collapsible envelope in the opposite direction.

2. A diaphragm fuel pump, comprising in combination, an outer envelope, an inlet valve and an outlet valve on said envelope, an inner collapsible and extensible envelope forming a liquid-tight joint with the outer envelope, a sliding rod secured to the inner collapsible envelope, an eccentric cam adapted to positively move said rod in the direction corresponding to suction, a shaft carrying said eccentric cam, a worm wheel on said shaft, a worm in mesh with the worm wheel, a shaft carrying said worm, an oil-tight gear case in which the sliding rod and shafts are supported and containing the eccentric cam and worm gearing, and elastic means adapted to return the inner collapsible envelope in the opposite direction.

3. In a diaphragm fuel pump adapted to be driven by a motor to which the fuel is delivered, the combination of an outer envelope carrying two valve chests containing each a clack valve for the suction and forcing out of fuel respectively, an inner collapsible and extensible envelope forming a fluid tight joint with the outer envelope, framework forming a gear case, a longitudinal sliding rod connected to said inner envelope guided by said gear case, an eccentrically journaled cam operating in a recess of said rod and rotated by a worm gear mounted on the motor shaft and a longitudinal spring coiled on said rod and urging the same back, whereby the delivery pressure balancing the spring causes breaking of the contact between the cam and the sliding rod recess.

4. A fuel-feeding system for internal combustion engines comprising a pump casing, a variable capacity pumping chamber therein, an inlet connection from the source of fuel supply through said casing to said pumping chamber, an outlet connection from said pumping chamber to the carbureter of the engine, a flexible pumping member in said casing forming a movable wall of said pumping chamber, means comprising an engine driven element operative to impart a positive suction stroke to said flexible pumping member to draw fuel into said pumping chamber through said inlet connection from the source of fuel supply and means whereby said member makes its pressure stroke by the force of resiliency to vary the supply of fuel automatically with the withdrawal of fuel from said carbureter.

5. A fuel-feeding system for engines comprising a pump casing, a variable capacity pumping chamber therein, an inlet connection from a source of fuel supply to said pumping chamber, an outlet connection from said pumping chamber to the carbureter of the engine, an imperforate flexible pumping member forming a sealing wall of said pumping chamber having a discharge stroke which varies automatically to maintain a fixed predetermined pressure on the supply of fuel to said carbureter and means having a lost motion connection with said flexible member for imparting a positive suction stroke after each discharge stroke.

6. In a fuel feeding system for engines, in combination a pump casing, a variable capacity pumping chamber in said casing, a constant capacity inlet communication from a source of fuel supply to said pumping chamber, an outlet connection from said pumping chamber to the fuel consuming elements of the engine, a flexible pumping member forming a wall of said pumping chamber, means having a lost motion connection with said flexible pumping member within said pump casing but outside of said pumping chamber to positively flex said member to provide a suction stroke for drawing fuel from the source of supply directly into the pumping chamber and resilient means within said pump casing co-acting with said member in producing a variable discharge stroke.

7. A fuel feeding system for engines comprising a variable capacity pumping chamber adapted to be connected to the source of fuel supply and a flow limited chamber of a carbureter for pumping fuel from said source of supply to said carbureter, a valve-controlled inlet passage to said pumping chamber, a valve-controlled outlet passage from said pumping chamber, an imperforate flexible member forming a sealing wall of said chamber and movable to produce expansion and reduction of said chamber, resilient means acting on said flexible member in a direction for reduction of said chamber whereby the movement of said flexible member is automatically variable to maintain a constant predetermined pressure on the fuel delivered to the carbureter and mechanical means intermittently operated by the engine for producing an expansion of said pumping chamber by a force greater than the resilient means to draw fuel into said pumping chamber from the source of supply and for permitting reduction of said chamber.

8. In a fuel-feeding system for engines, in combination, a pump casing, a variable capacity pumping chamber therein, an inlet connection from the source of fuel supply through said casing to said pumping chamber, an outlet connection from said pumping chamber to the carbureter of the engine, an imperforate flexible pumping member in said casing, mechanical means to positively flex said member to provide a suction stroke to draw fuel into the pumping chamber through said inlet connection from the source of supply and resilient discharge means within said pump casing cooperating with said pumping member and arranged to be conditioned for reaction by the positive suction stroke, whereby the resilient means acts alone to cause the discharge stroke.

9. In a fuel-feeding system for engines, in combination, a pump casing, a variable capacity pumping chamber therein, an inlet connection from the source of fuel supply through said casing to said pumping chamber, an outlet connection from said pumping chamber to the carbureter of the engine, a flexible pumping member in said casing forming a wall of said pumping chamber, mechanical means arranged to positively flex said member to provide a suction stroke to draw fuel from the source of supply into said pumping chamber through said inlet connection and resilient discharge means cooperating with said pumping member to produce the discharge stroke arranged to be conditioned for reaction by the positive suction stroke, said mechanical means and said resilient means being disposed outside of said pumping chamber but within said pump casing.

10. In a fuel-feeding system for engines, in combination, a pump casing, a variable capacity pumping chamber therein, an inlet connection from a source of fuel supply through said casing to said pumping chamber, an outlet connection from said pumping chamber to the carbureter of the engine, a flexible wall in said casing sealing said pumping chamber, mechanical means comprising an engine driven element operative to flex said wall to provide a positive suction stroke to draw fuel from the source of supply into said casing through said inlet connection and resilient discharge means within said pump casing arranged to be conditioned for reaction by the positive suction stroke of said flexible wall, whereby the pressure of the fuel being fed may limit the effective discharge stroke of said flexible wall.

11. In a fuel-feeding system for engines, a fuel pump comprising an expansible and reducible pumping chamber, a valve-controlled inlet connection from the source of fuel supply to said pumping chamber, a valve-controlled outlet connection from said pumping chamber to the carbureter of the engine, an imperforate pumping member forming a wall of said pumping chamber, mechanical means comprising an engine driven element having a lost motion connection with the flexible pumping member operative to impart a positive suction stroke to said flexible pumping member to draw fuel from the source of supply through the inlet connection past the inlet valve and into said pumping chamber and resilient means arranged to cooperate with said flexible pumping member to impart a variable discharge stroke thereto disposed outside of said pumping chamber.

12. A diaphragm fuel pump comprising in combination an outer casing, an inlet valve in said casing controlling an inlet communication to said casing from a source of fuel supply, an outlet valve in said casing controlling an outlet communication to the constant level fuel chamber of a carbureter, an inner flexible pumping diaphragm forming a fluid tight seal with the outer casing, an operating stem secured to the flexible diaphragm, an eccentric cam adapted to positively move said stem in the direction corresponding to suction and resilient means adapted to return the flexible diaphragm in the opposite direction and to maintain a uniform pressure on the fuel supply to the carbureter whereby the delivery stroke may be variable in accordance with the requirements of the carbureter.

13. A diaphragm fuel pump comprising in combination, a pump casing, a valve-controlled inlet connection to said casing from a low level source of fuel supply, a valve-controlled outlet connection from said casing to the constant level fuel chamber of a carbureter, an imperforate flexible pumping diaphragm supported by said casing forming a sealing wall between the pumping chamber on one side of the diaphragm through which the fuel flows and a cavity of the casing on the opposite side of the diaphragm, an operating stem secured to the flexible diaphragm extending through said cavity, said casing having a wall for said cavity through which said operating stem extends, said casing having a second cavity beyond said wall into which said operating stem extends, means extending into said second cavity having a lost motion connection with said stem within said cavity for positively operating said stem in a suction direction to draw fuel from the source of fuel supply into the pumping chamber and resilient means for imparting a variable discharge stroke to the diaphragm in accordance with the demands of the carbureter.

14. A diaphragm fuel pump comprising in combination, a pump casing, a valve-controlled inlet connection to said casing from a source of fuel supply, a valve-controlled outlet connection from said casing to the constant level fuel chamber of a carbureter, an imperforate pumping diaphragm supported by said casing, forming a sealing wall between a pumping chamber through which the fuel flows from the inlet to the outlet connection and a cavity of said casing, an operating stem secured to the flexible diaphragm extending through said cavity, said casing having a wall for said cavity forming a guide bearing for the operating stem, said casing having a second cavity beyond said wall into which said operating stem extends, means extending into said second cavity having a lost motion connection with said stem for positively operating said stem in a suction direction to draw fuel from a source of fuel supply into the pumping chamber and resilient means for imparting a variable discharge stroke to said diaphragm in accordance with the demands of the carbureter.

15. A diaphragm fuel pump, comprising in combination, a first casing member, an inlet valve in said casing member controlling an inlet communication to a source of fuel supply, an outlet valve in said casing controlling an outlet communication to the constant level fuel chamber of a carbureter, a flexible pumping diaphragm in sealing engagement at its annular edge with the first casing member, a second casing member in sealing engagement with said diaphragm, an operating stem secured to the flexible diaphragm and extending into said second casing member, said second casing member forming a guide bearing for the operating stem, means extending into said second casing member having a lost motion connection with said stem for positively operating said stem in a suction direction and means for imparting a variable discharge stroke to said diaphragm.

16. A diaphragm fuel pump comprising in combination a pair of casing members, a flexible pumping diaphragm held by its annular edge in sealing engagement by the said pair of casing members whereby a pumping chamber is provided between said flexible diaphragm and one of said casing members, a valve controlled inlet passage to said pumping chamber adapted to be connecetd to the source of fuel supply, a valve controlled outlet passage from said pumping chamber adapted to be connected to the constant level chamber of a carbureter, an operating stem secured to said flexible diaphragm and extending away from said pumping chamber, one of said casing members having a lubricant chamber into which said stem extends, said last mentioned casing member forming a guide bearing for said stem between said flexible diaphragm and said lubricant chamber, operating means extending into said lubricant chamber having a lost motion connection with said stem for positively moving said flexible diaphragm in a suction direction and resilient means reacting between said stem and a fixed part of one of said casing members whereby a positive suction stroke conditions the resilient means for reaction to impart a variable discharge stroke to said flexible pumping diaphragm in accordance with the requirements of the carbureter.

Signed at Paris, France, this 21st day of March, 1930.

JEAN LOUIS LÉON ALEXANDRE ALBERT MOULET.

CERTIFICATE OF CORRECTION.

Reissue Patent No. 18,112. Granted June 23, 1931, to

JEAN LOUIS LEON ALEXANDRE ALBERT MOULET.

It is hereby certified that error appears in the printed specification of the above numbered patent requiring correction as follows: Page 1, line 4, for the misspelled word "aeroplones" read aeroplanes; line 40, for "envlope" read envelope; page 3, line 75, claim 9, after "engine" strike out the article "a" and insert an imperforate; page 4, line 98, claim 16, for "connecetd" read connected; and that the said Letters Patent should be read with these corrections therein that the same may conform to the record of the case in the Patent Office.

Signed and sealed this 29th day of September, A. D. 1931.

M. J. Moore,
Acting Commissioner of Patents.

(Seal)